United States Patent
Uziel et al.

(10) Patent No.: US 11,129,110 B1
(45) Date of Patent: Sep. 21, 2021

(54) SIDELINK CONTROL CHANNEL REINFORCING IN VEHICLE BASED WIRELESS COMMUNICATIONS

(71) Applicant: QUALCOMM incorporated, San Diego, CA (US)

(72) Inventors: Lior Uziel, Hod Hasharon (IL); Omri Netanel Mamo, Petah Tikva (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/922,878

(22) Filed: Jul. 7, 2020

(51) Int. Cl.
*H04W 52/16* (2009.01)
*H04W 92/18* (2009.01)

(52) U.S. Cl.
CPC ............ *H04W 52/16* (2013.01); *H04W 92/18* (2013.01)

(58) Field of Classification Search
CPC ... H04W 52/16; H04W 92/18; H04W 72/044; H04W 24/08; H04W 52/383; H04W 4/70; H04W 52/0209; H04W 74/002; H04B 7/0695; H04B 17/318; H04B 7/088; H04B 17/309; H04B 17/382
USPC ........................................................ 455/522
See application file for complete search history.

(56) References Cited

U.S. PATENT DOCUMENTS

2020/0351833 A1* 11/2020 Chae ................... H04W 52/383

* cited by examiner

*Primary Examiner* — Shaima Q Aminzay
(74) *Attorney, Agent, or Firm* — Holland & Hart LLP

(57) ABSTRACT

Methods, systems, and devices for wireless communications are described. A first user equipment (UE) may determine that a second UE is to transmit a control channel message retransmission using a first subchannel of a sidelink control channel during a subframe. The first UE may determine that the first UE is to transmit a sidelink transmission using a second subchannel of the sidelink control channel during the subframe, the second subchannel being different from the first subchannel. The first UE may transmit, by the first UE and during the subframe, the control channel message retransmission of the second UE using the first subchannel and the sidelink transmission of the first UE using the second subchannel.

32 Claims, 11 Drawing Sheets

SIDELINK CONTROL CHANNEL REINFORCING IN VEHICLE BASED WIRELESS COMMUNICATIONS

FIELD OF TECHNOLOGY

The following relates generally to wireless communications and more specifically to sidelink control channel reinforcing in vehicle based wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink control channel reinforcing in vehicle based wireless communications. Generally, the described techniques provide for user equipment(s) (UE)(s) to chorus a sidelink retransmission of a neighbor UE. A chorusing UE (e.g., a first UE) may determine that a neighbor UE (e.g., a second UE) is going to perform a control channel message during a subframe (e.g., at the symbol level, slot level, subframe level, etc.). For example, the chorusing or first UE may identify that the neighbor or second UE has performed an initial transmission of the control channel message (e.g., a physical sidelink control channel (PSCCH) transmission as well as the corresponding physical sidelink shared channel (PSSCH) transmission), which indicates that a retransmission of the control channel message (e.g., a PSCCH retransmission) will be performed during the subframe. The chorusing or first UE may also determine that it will also be performing a sidelink transmission on non-overlapping resources (e.g., using a different subchannel). Accordingly, the chorusing or first UE may perform its sidelink transmission on a subchannel that is different from the subchannel that the neighbor or second UE is also performing its control channel message retransmission. That is, both the chorusing UE (e.g., the first UE) and the neighbor UE (e.g., the second UE) may both transmit the control channel message retransmission of the neighbor or second UE on the same subchannel (e.g., a first subchannel), while the chorusing or first UE performs its sidelink transmission on a different subchannel (e.g., a second subchannel or other non-overlapping resource).

A method of wireless communication at a first UE is described. The method may include determining that a second UE is to transmit a control channel message retransmission using a first subchannel of a sidelink control channel during a subframe, determining that the first UE is to transmit a sidelink transmission using a second subchannel of the sidelink control channel during the subframe, the second subchannel being different from the first subchannel, and transmitting, by the first UE and during the subframe, the control channel message retransmission of the second UE using the first subchannel and the sidelink transmission of the first UE using the second subchannel.

An apparatus for wireless communication at a first UE is described. The apparatus may include a processor, memory coupled with the processor, and instructions stored in the memory. The instructions may be executable by the processor to cause the apparatus to determine that a second UE is to transmit a control channel message retransmission using a first subchannel of a sidelink control channel during a subframe, determine that the first UE is to transmit a sidelink transmission using a second subchannel of the sidelink control channel during the subframe, the second subchannel being different from the first subchannel, and transmit, by the first UE and during the subframe, the control channel message retransmission of the second UE using the first subchannel and the sidelink transmission of the first UE using the second subchannel.

Another apparatus for wireless communication at a first UE is described. The apparatus may include means for determining that a second UE is to transmit a control channel message retransmission using a first subchannel of a sidelink control channel during a subframe, determining that the first UE is to transmit a sidelink transmission using a second subchannel of the sidelink control channel during the subframe, the second subchannel being different from the first subchannel, and transmitting, by the first UE and during the subframe, the control channel message retransmission of the second UE using the first subchannel and the sidelink transmission of the first UE using the second subchannel.

A non-transitory computer-readable medium storing code for wireless communication at a first UE is described. The code may include instructions executable by a processor to determine that a second UE is to transmit a control channel message retransmission using a first subchannel of a sidelink control channel during a subframe, determine that the first UE is to transmit a sidelink transmission using a second subchannel of the sidelink control channel during the subframe, the second subchannel being different from the first subchannel, and transmit, by the first UE and during the subframe, the control channel message retransmission of the second UE using the first subchannel and the sidelink transmission of the first UE using the second subchannel.

Some examples of the method, apparatuses, and non-transitory computer-readable medium described herein may further include operations, features, means, or instructions for identifying an available transmit power limit for transmitting on the sidelink control channel during the subframe, and determining that a first transmit power for transmitting the control channel message retransmission of the second UE during the subframe satisfies less than a threshold percentage of the available transmit power limit.

Some examples of the method, apparatuses, and non-transitory computer-readable medium described herein may further include operations, features, means, or instructions for selecting the first transmit power for transmitting the sidelink transmission using the second subchannel of the sidelink control channel during the subframe.

Some examples of the method, apparatuses, and non-transitory computer-readable medium described herein may further include operations, features, means, or instructions for receiving a control channel message initial transmission and corresponding data channel transmission from the second UE during a previous subframe, and determining that the control channel message retransmission may be to be transmitted by the second UE during the subframe based on the control channel message initial transmission and corresponding data channel transmission.

Some examples of the method, apparatuses, and non-transitory computer-readable medium described herein may further include operations, features, means, or instructions for decoding the control channel message initial transmission and corresponding data channel transmission, where the control channel message retransmission may be transmitted on the first subchannel of the sidelink control channel during the subframe based on the decoding.

Some examples of the method, apparatuses, and non-transitory computer-readable medium described herein may further include operations, features, means, or instructions for selecting a cyclic shift for transmitting the control channel message retransmission using the first subchannel.

In some examples of the method, apparatuses, and non-transitory computer-readable medium described herein, the selected cyclic shift may be different from a cyclic shift used by the second UE for transmitting the control channel message retransmission using the first subchannel during the subframe.

In some examples of the method, apparatuses, and non-transitory computer-readable medium described herein, the selected cyclic shift may be the same as a cyclic shift used by the second UE for transmitting the control channel message retransmission using the first subchannel during the subframe.

DETAILED DESCRIPTION

Figure 1:
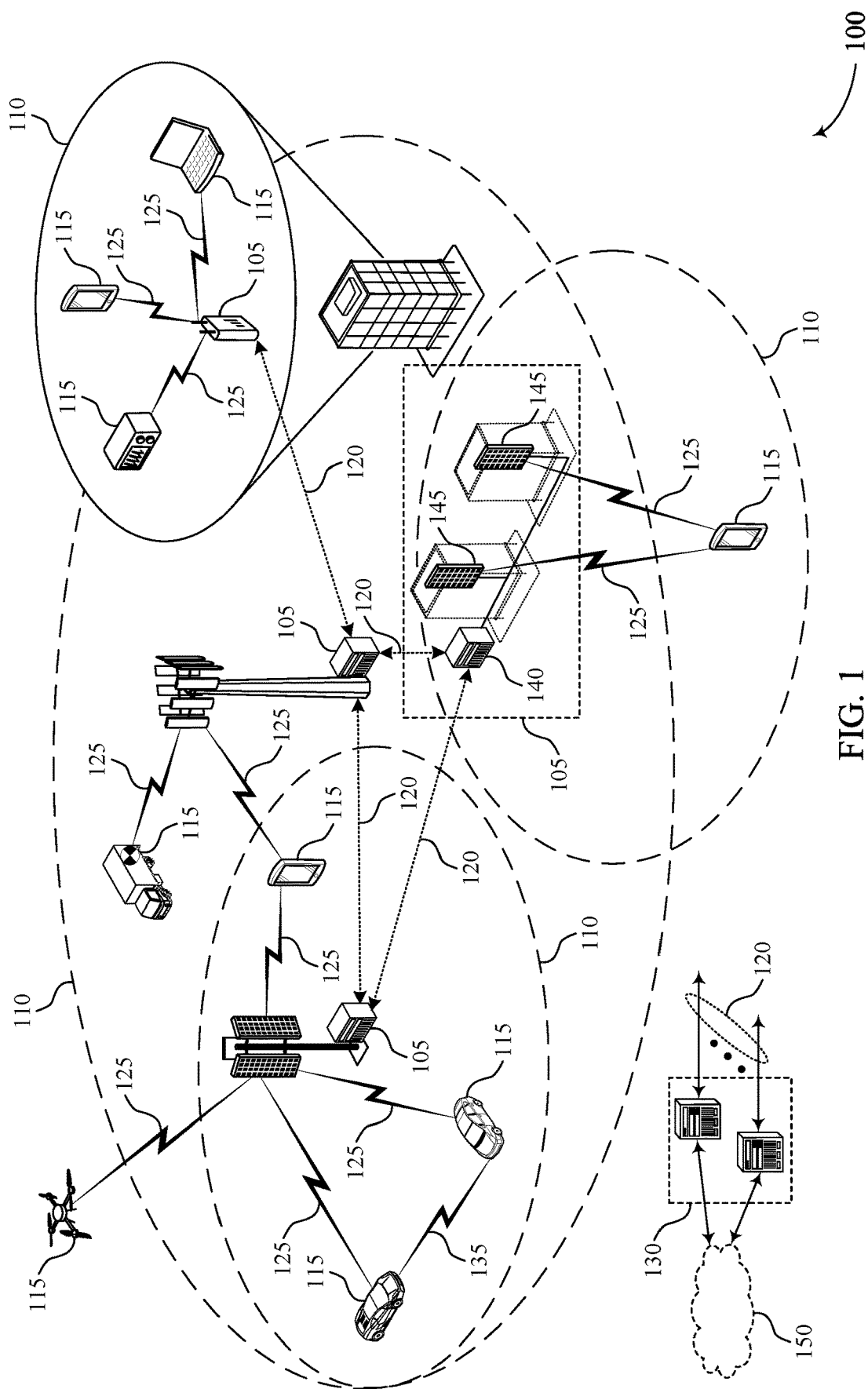
FIG. 1 illustrates an example of a system for wireless communications that supports sidelink control channel reinforcing in vehicle based wireless communications in accordance with aspects of the present disclosure.

A wireless multiple-access communications system may include a number of base stations or network access nodes, each simultaneously supporting communication for multiple communication devices, which may be otherwise known as user equipment (UE). Some wireless networks may support vehicle based communications, such as vehicle-to-everything (V2X) networks, vehicle-to-vehicle (V2V) networks, cellular V2X (CV2X) networks, or other similar networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). Communications within a vehicle based network may be performed using wireless signals communicated over sidelink channels, such as a physical sidelink control channel (PSCCH) and/or a physical sidelink shared channel (PSSCH) (e.g., either a PSCCH transmission and a PSCCH and corresponding PSSCH transmission). In some aspects, communications within a CV2X network may be performed between UEs over a PC5 interface, which may include such sidelink channels.

Aspects of the disclosure are initially described in the context of wireless communications systems. Generally, the described techniques provide for user equipment(s) (UE)(s) to chorus a sidelink retransmission of a neighbor UE. A chorusing UE (e.g., a first UE) may determine that a neighbor UE (e.g., a second UE) is going to perform a control channel message during a subframe (e.g., at the symbol level, slot level, subframe level, etc.). For example, the chorusing or first UE may identify that the neighbor or second UE has perform an initial transmission of the control channel message (e.g., a physical sidelink control channel (PSCCH) transmission as well as the corresponding physical sidelink shared channel (PSSCH) transmission), which indicates that a retransmission of the control channel message (e.g., a PSCCH retransmission) will be performed during the subframe. The chorusing or first UE may also determine that it will also be performing a sidelink transmission on non-overlapping resources (e.g., using a different subchannel). Accordingly, the chorusing or first UE may perform its sidelink transmission on a subchannel that is different from the subchannel that the neighbor or second UE is also performing its control channel message retransmission. That is, both the chorusing UE (e.g., the first UE) and the neighbor UE (e.g., the second UE) may both transmit the control channel message retransmission of the neighbor or second UE on the same subchannel (e.g., a first subchannel), while the chorusing or first UE performs its sidelink transmission on a different subchannel (e.g., a second subchannel or other non-overlapping resource).

Aspects of the disclosure are further illustrated by and described with reference to apparatus diagrams, system diagrams, and flowcharts that relate to sidelink control channel reinforcing in vehicle based wireless communications.

FIG. 1 illustrates an example of a wireless communications system 100 that supports sidelink control channel reinforcing in vehicle based wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)).

Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
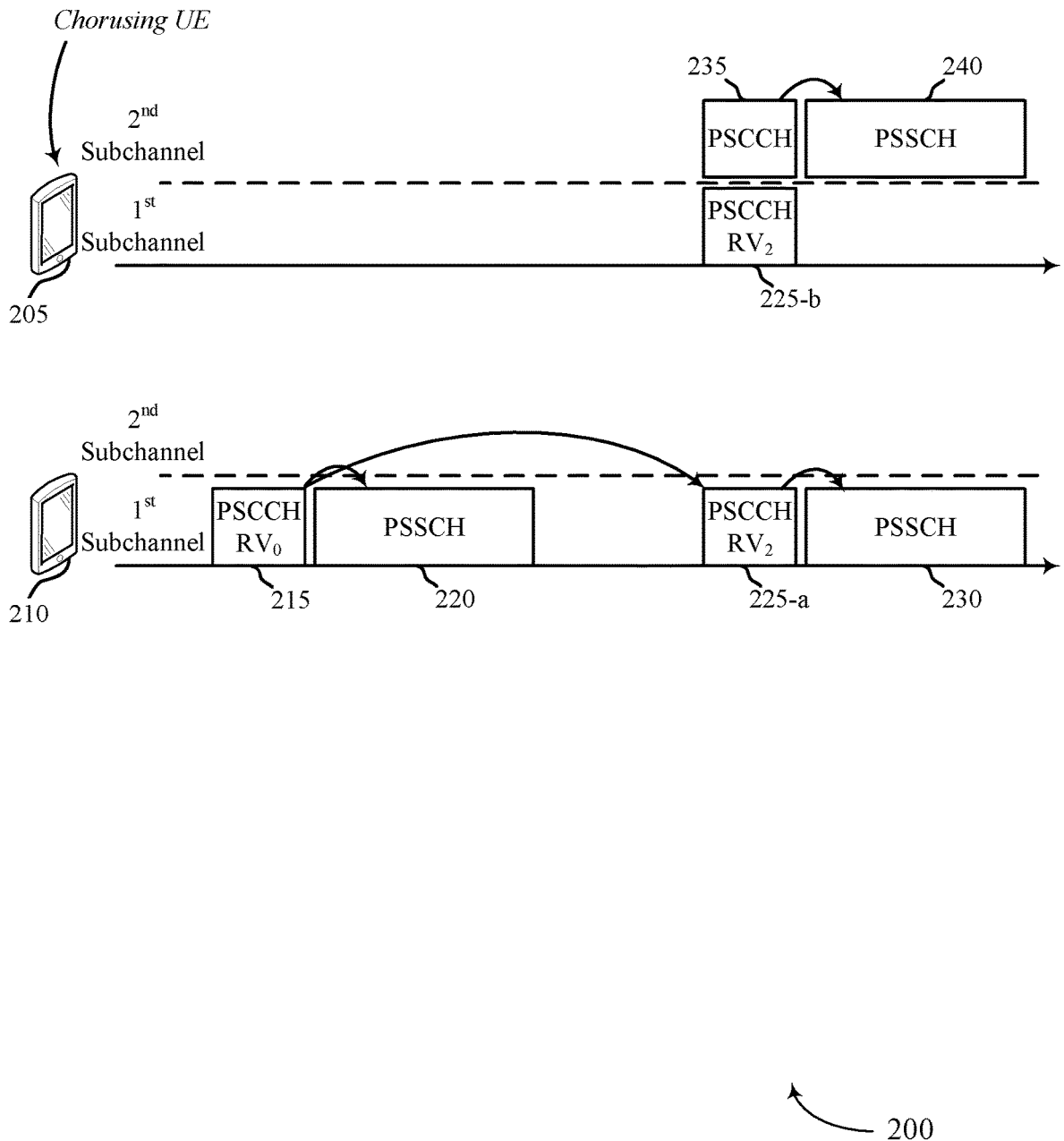
FIG. 2 illustrates an example of a wireless communication system that supports sidelink control channel reinforcing in vehicle based wireless communications in accordance with aspects of the present disclosure.

A UE 115, which may be referred to as a first UE in this example, may determine that a second UE 115 (e.g., a neighbor UE) is to transmit a control channel message retransmission using a first subchannel of a sidelink control channel during a subframe. The UE 115 may determine that the first UE 115 is to transmit a sidelink transmission using a second subchannel of the sidelink control channel during the subframe, the second subchannel being different from the first subchannel. The UE 115 may transmit, during the subframe, the control channel message retransmission of the second UE 115 using the first subchannel and the sidelink transmission of the first UE 115 using the second subchannel FIG. 2 illustrates an example of a wireless communication system 200 that supports sidelink control channel reinforcing in vehicle based wireless communications in accordance with aspects of the present disclosure. In some examples, wireless communication system 200 may implement aspects of wireless communication system 100. Wireless communication system 200 may include UE 205 and UE 210, which may be examples of the corresponding device described herein. In some aspects, UE 205 may be considered a first UE and/or chorusing UE and UE 210 may be considered a second UE and/or neighbor UE.

In some aspects, UE 205 and UE 210 may be part of a wireless network performing vehicle-based communications over a sidelink channel. For example, UE 205 and/or UE 210 may perform wireless transmissions over a PSCCH, over a PSSCH, and the like. Accordingly, in some examples both UE 205 and UE 210 may also be considered CV2X UEs or devices.

Such communications over a sidelink channel may experience various disruptions. For example, congestion may be created when transmissions for multiple CV2X UEs collide and/or overlap. Overlapping may include two or more CV2X UEs transmitting control and data channels (e.g., PSCCH and PSSCH) on the same resources (e.g., time and/or frequency resources). In some examples, overlapping may include two or more CV2X UEs transmitting control and data channels (e.g., PSCCH and/or PSCCH+PSSCH) on the same time resources, with full or at least partially overlapping frequency resources. Collisions may occur when two or more CV2X UEs transmit control channel messages (e.g., PSCCH) on the same resources. Collisions of CV2X UE PSCCH transmissions, for example, may be particularly troublesome as the loss of the PSCCH transmission (e.g., the sidelink control information (SCI) grant carried in the PSCCH transmission) may also mean that the receiving UE may lose the corresponding PSSCH transmission scheduled by the PSCCH transmission. This may result in waste of both the PSCCH and the PSSCH resources.

To avoid or mitigate this, wireless communication system 200 may employ various techniques. For example, wireless communication system 200 may use a hybrid automatic-repeat/request (HARQ) binding mechanism where the initial transmission (e.g., an initial PSCCH transmission with redundancy version 0 ($RV_0$) scheduling a corresponding PSSCH transmission) indicates the retransmission, as well as when the retransmission will occur (e.g., a subframe gap between the initial transmission and retransmission, such as a 1/2/ . . . /15 subframe(s) gap). Accordingly, the PSCCH $RV_0$ transmission may point to the PSCCH $RV_2$ retransmission, and vice versa. For example, the SCI indicated in the initial PSCCH $RV_0$ transmission may be indicated in the PSCCH $RV_2$ retransmission.

More particularly, UE 210 (e.g., the neighbor or second UE in this example) may perform a control channel message initial transmission (e.g., PSCCH 215) and the corresponding data channel transmission (e.g., PSSCH 220) on a first subchannel. That is, the PSCCH 215 initial transmission may carry or otherwise convey an SCI scheduling the corresponding PSSCH 220 transmission. As the PSCCH 215 transmission is the initial transmission, it may have a corresponding $RV_0$ configuration (e.g., the SCI may include a RV field that is set to 0). Subsequently (e.g., in a subframe occurring any time after the previous subframe in which the PSCCH 215 initial transmission occurs, which may correspond to the subframe gap), UE 210 may perform a control channel message retransmission (e.g., PSCCH 225) and the corresponding data channel transmission (e.g., PSSCH 230). That is, the PSCCH 225 retransmission may carry or otherwise convey an SCI scheduling the corresponding PSSCH 230 transmission. As the PSCCH 225 transmission is the retransmission, it may have a corresponding $RV_2$ configuration (e.g., the SCI may include a RV field that is set to 2). As discussed, PSCCH 215 and PSCCH 225 may generally point to each other, e.g., carry or otherwise convey information identifying the other transmission.

Accordingly, UE 205 (e.g., the chorusing or first UE) may chorus the PSCCH 225 $RV_2$ transmission of UE 210 in order to reinforce the PSCCH retransmission to improve detectability. That is, a CV2X device receiving the PSCCH 225 retransmission from UE 205 and UE 210 may combine the signals in order to improve recoverability of the SCI scheduling PSSCH 230. For example, UE 205 may detect the control channel message initial transmission (e.g., the PSCCH 215 $RV_0$ transmission) and corresponding data channel transmission (e.g., PSSCH 220) from UE 210 during a previous subframe (e.g., 0-15, 20, or some other number of subframes prior to the subframe in which the control channel message retransmission occurs). UE 205 may recover (e.g., decode) the SCI conveyed in the PSCCH 215 initial transmission and/or other information carried or otherwise conveyed in the PSSCH 220 transmission. Accordingly, UE 205 may determine that UE 205 is going to transmit a control channel message retransmission (e.g., the PSCCH 225 $RV_2$ retransmission) during a subsequent subframe. As UE 205 has recovered the SCI or other information conveyed in PSCCH 215 and/or PSSCH 220, UE 205 is aware of the SCI to be included in the control channel message retransmission (e.g., PSCCH 225). Accordingly, UE 205 may determine that it is able to chorus or otherwise transmit the control channel message retransmission of UE 210 during the subframe (e.g., the subsequent subframe) based on various considerations.

In some aspects, this may be based on UE 205 also being scheduled or otherwise configured to transmit a sidelink transmission during the same subframe and on a non-overlapping resource (e.g., on different subchannels). For example, UE 205 may determine that it has a sidelink transmission scheduled on a second subchannel that is different from the first subchannel used for the control channel message retransmission. Accordingly, this may mean that UE 205 is scheduled to be transmitting during the subframe, which would already limit or otherwise impact the ability of UE 205 to monitor for signals during the subframe. That is, UE 205 performing its own sidelink transmission during the subframe may indicate, at least to some degree, that UE 205 is available to chorus the control channel message retransmission of UE 210 during the subframe.

In some aspects, this chorusing may be based on the available transmit power of UE 205. For example, UE 205 may determine that it has an available transmit power limit for transmissions on the sidelink channel during the subframe. UE 205 may determine that the transmit power for transmitting the control channel message retransmission of UE 210 during the subframe (e.g., the transmit power of PSCCH 225-*b*) satisfies less than a threshold percentage of the available transmit power limit. That is, UE 205 may first confirm that chorusing the control channel message retransmission of UE 210 would not be overly detrimental or costly in terms of its available transmit power limit for the sidelink channel during the subframe. Accordingly, chorusing the control channel message retransmission of UE 210 may not be overly burdensome or costly for UE 205.

In some aspects, this chorusing may be based on the configuration of UE 205. For example, UE 205 may determine that it has multiple transmit chains configured and available for transmission during the subframe on the different subchannels.

In some aspects, this chorusing may be based on the availability of the first subchannel for performing the chorusing transmission (e.g., PSCCH 225-*b*). For example, UE 205 may determine that multiple CV2X devices will be performing sidelink transmissions on the first subchannel during the subframe. UE 205 may determine whether or not to chorus the PSCCH 225 $RV_2$ retransmission of UE 210 based on a congestion level of the first subchannel during the subframe. More particularly, if UE 205 detects or otherwise determines that less than a threshold number of other sidelink transmissions will occur on the first subchannel during the subframe, it may determine to perform the PSCCH 225-*b* chorusing transmission during the subframe. This may be based on UE 205 detecting multiple initial sidelink transmissions from other devices communicating on the sidelink channel.

Accordingly, UE 205 may determine that it will chorus or transmit (e.g., reinforce) the control channel message retransmission of UE 210 (e.g., PSCCH 225) during the subframe. That is, UE 205 may transmit the control channel message retransmission (e.g., PSCCH 225-b) of UE 210 on the first subchannel while also performing its own sidelink transmission (e.g., the PSCCH 235 transmission as well as the corresponding PSSCH 240 transmission) during the subframe. Simultaneously, UE 210 may also be performing its own control channel message retransmission during the subframe (e.g., PSCCH 225-a retransmission as well as the corresponding PSCCH 230 transmission).

In some aspects, UE 205 may transmit PSCCH 225-b with the same SCI as UE 210 transmits in its PSCCH 225-a retransmission. For example, UE 205 may identify or otherwise determine the SCI based on PSCCH 215 and/or PSSCH 220 decoded during the previous subframe.

In some aspects, UE 205 may perform the control channel message retransmission of UE 210 using the same transmit power level or a different transmit power level as it uses for its own sidelink transmission (e.g., PSCCH 235), e.g., based on the available transmit power limit. For example, UE 205 may identify or otherwise select a transmit power level for the control channel message retransmission of UE 210 based on its available transmit power limit for transmissions on the sidelink channel during the subframe.

In some aspects, UE 205 may also select a cyclic shift for transmitting the control channel message retransmission of UE 210 using the first subchannel. As UE 205 may be unaware of what cyclic shift UE 210 will use for its control channel message retransmission (e.g., PSCCH 225-a), UE 205 may use the same cyclic shift or a different cyclic shift for transmission of PSCCH 225-b as UE 210 uses for transmission of PSCCH 225-a. Although FIG. 2 illustrates PSCCH 215/PSSCH 220 and PSCCH 225-a/PSSCH 230 being transmitted on the first subchannel, it is to be understood that the sidelink initial transmission and retransmission may occur on different subchannels. For example, PSCCH 215 and PSSCH 220 may be transmitted on one subchannel (e.g., subchannel A, subchannel B, subchannel C, and so on), while PSCCH 225-a and PSSCH 230 are transmitted on a different subchannel (e.g., subchannel M, subchannel N, subchannel O, and so on). As discussed above, the initial transmission may signal the retransmission, which may include an indication of which subchannel the retransmission (e.g., PSCCH 225-a and PSSCH 230) will be performed. Accordingly, UE 205 may determine that its sidelink transmission occurs on a non-overlapping resource (e.g., on any subchannel that is different from the subchannel in which PSCCH 225-a and PSSCH 230 are performed), and therefore chorus the sidelink retransmission of UE 210 during the subframe.

Accordingly, a CV2X device may receive both PSCCH 225-a from UE 205 and PSCCH 225-b from UE 210 and use various combining techniques to improve recoverability of the SCI scheduling PSSCH 230.

Figure 3:
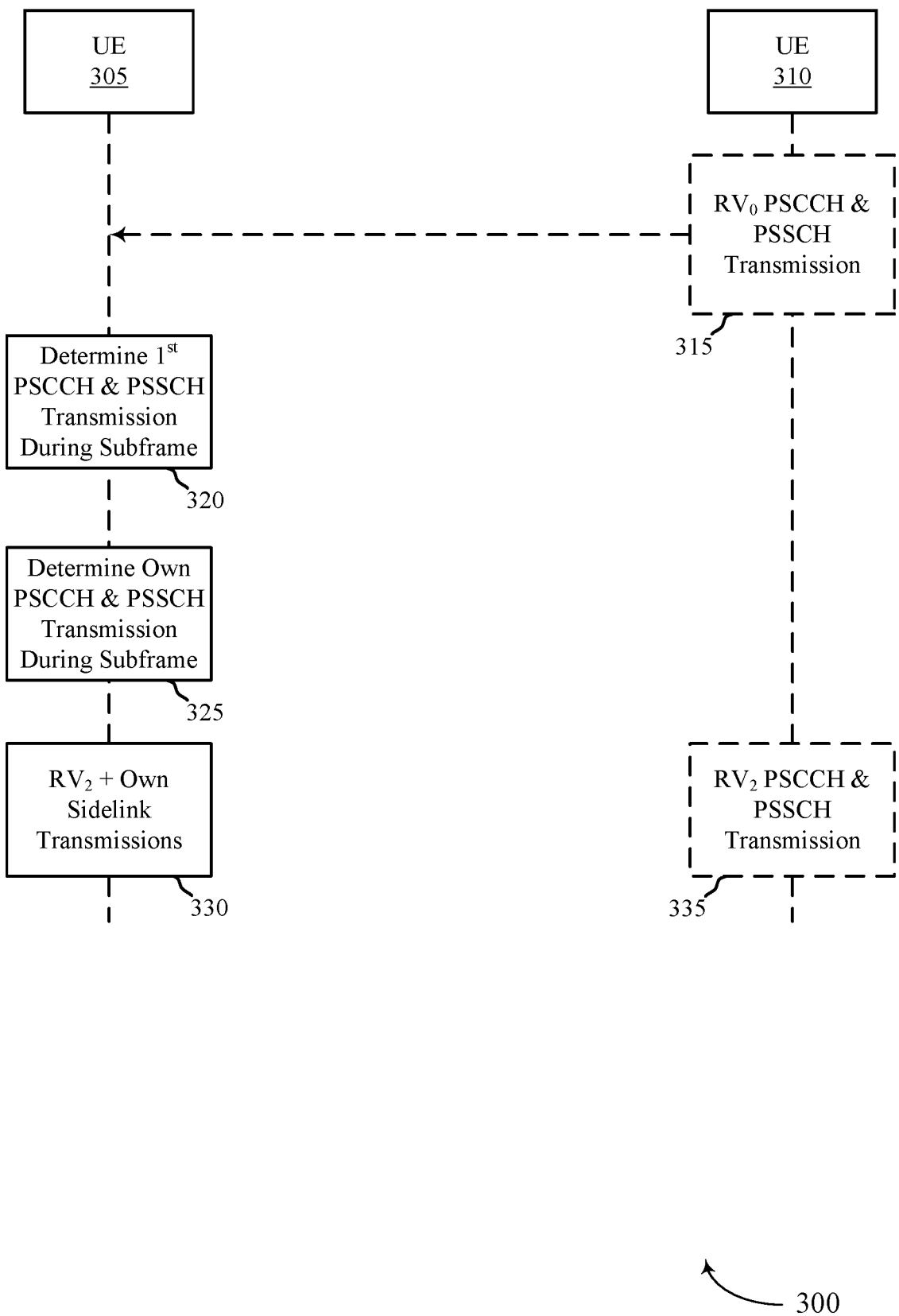
FIG. 3 illustrates an example of a process that supports sidelink control channel reinforcing in vehicle based wireless communications in accordance with aspects of the present disclosure.

FIG. 3 illustrates an example of a process 300 that supports sidelink control channel reinforcing in vehicle based wireless communications in accordance with aspects of the present disclosure. In some examples, process 300 may implement aspects of wireless communication systems 100 and/or 200. Aspects of process 300 may be implemented by UE 305 and UE 310, which may be examples of corresponding device described herein. In some aspects, UE 305 may be considered a first or chorusing UE and UE 310 may be considered a second or neighbor UE.

At 315, UE 310 may optionally transmit (and UE 305 may receive) a control channel message initial transmission (e.g., the PSCCH $RV_0$ initial transmission) and corresponding data transmission (e.g., the PSSCH transmission scheduled by the PSCCH initial $RV_0$ transmission) during a previous subframe (e.g., 0-20 or some other number of subframes). For example, the subframe gap indicated in the $RV_0$ transmission may indicate when the $RV_2$ transmission will occur (e.g., may indicate the number of subframes between the initial transmission and the retransmission). In some aspects, UE 310 may configure the control channel message initial transmission to carry or otherwise convey an indication of a control channel message retransmission to be performed during a subsequent subframe, e.g., the subframe gap between the initial and retransmission of the control channel message.

At 320, UE 305 may determine that a second UE (e.g., UE 310) is to transmit a control channel message retransmission using a first subchannel of a sidelink control channel during a subframe. In some aspects, this may include UE 305 decoding the control channel message and/or corresponding data channel message initial transmissions at 315. Based on the decoding, UE 305 may determine that the retransmission will occur during the subframe from UE 310.

At 325, UE 305 may determine that it is to transmit a sidelink transmission using a second subchannel of the sidelink control channel during the same subframe. In some aspects, the second subchannel may be different than the first subchannel, e.g., a non-overlapping resource. In some aspects, the sidelink transmission of UE 305 may include a PSCCH transmission as well as the corresponding PSSCH transmission scheduled by the SCI carried in the PSCCH transmission.

At 330, UE 305 may transmit the control channel message retransmission of UE 310 using the first subchannel and the sidelink transmission of UE 305 using the second subchannel. That is, UE 305 may perform the PSCCH $RV_2$ retransmission of UE 310 on non-overlapping resources while performing its own sidelink transmission during the subframe.

In some aspects, this may include UE 305 identifying an available transmit power limit for transmitting on the sidelink control channel during the subframe. UE 305 may determine that a first transmit power for transmitting the control channel message retransmission of UE 310 during the subframe satisfies less than a threshold percentage of the available transmit power limit. Accordingly, UE 305 may select the first transmit power for transmitting the sidelink transmission using the second subchannel of the sidelink control channel and/or the for transmitting the control channel message retransmission of UE 310 during the subframe. In some aspects, this may include UE 305 selecting the same or a different cyclic shift for transmitting the control channel message retransmission of UE 310. For example, UE 305 may not know which cyclic shift UE 310 will use for the control channel message retransmission of UE 310 during the subframe. Accordingly, UE 305 may blindly select a cyclic shift for the retransmission, which may be the same or a different cyclic shift for transmitting the control channel message retransmission of UE 310.

At 335, UE 310 may optionally perform its own control channel message retransmission (e.g., the PSCCH $RV_2$ retransmission) and corresponding data transmission (e.g., the PSSCH transmission scheduled by the SCI carried in the PSCCH $RV_2$ retransmission) on the first subchannel.

Figure 4:
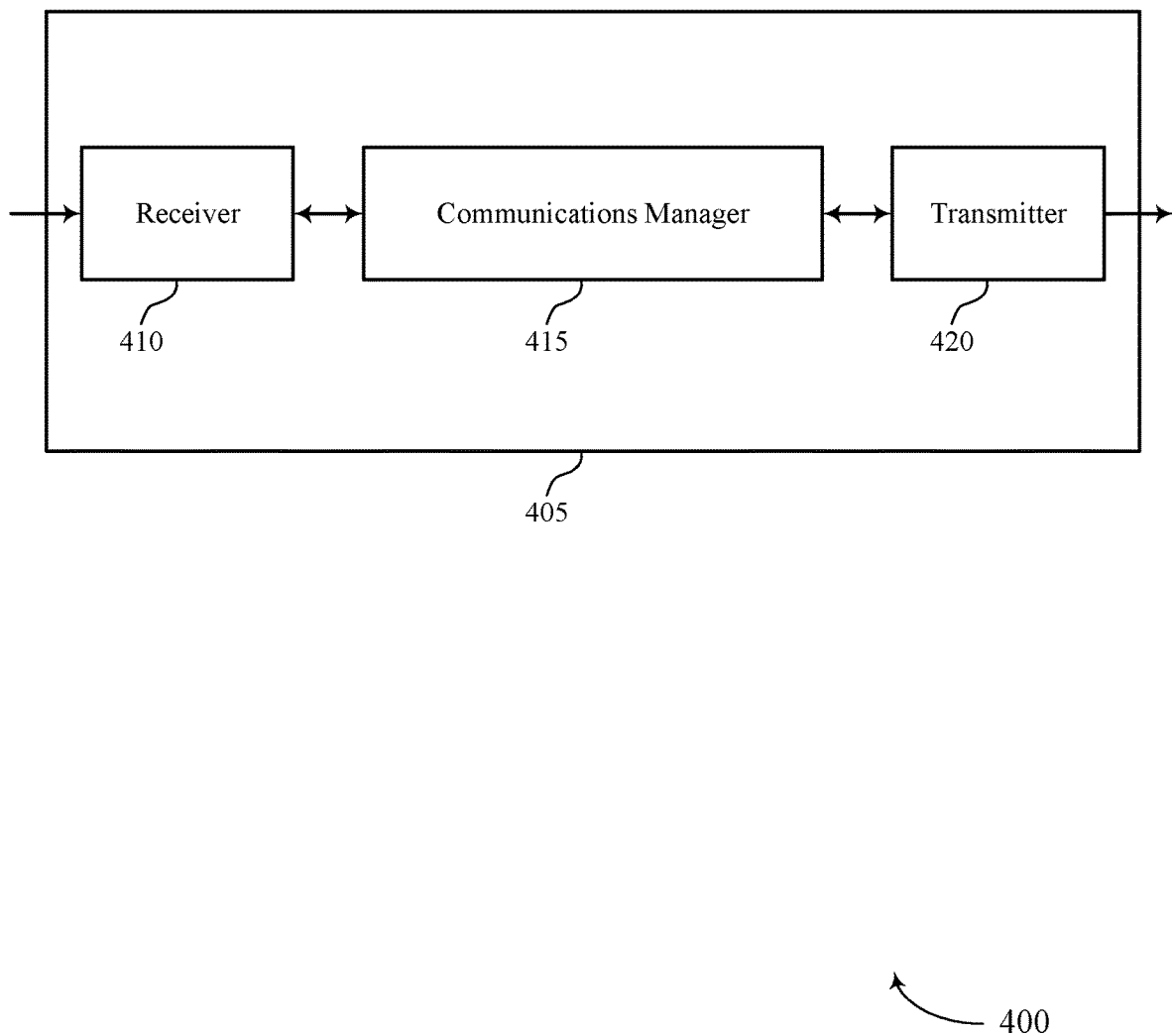
FIGS. 4 and 5 show block diagrams of devices that support sidelink control channel reinforcing in vehicle based wireless communications in accordance with aspects of the present disclosure.

FIG. 4 shows a block diagram 400 of a device 405 that supports sidelink control channel reinforcing in vehicle based wireless communications in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to sidelink control channel reinforcing in vehicle based wireless communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine that a second UE is to transmit a control channel message retransmission using a first subchannel of a sidelink control channel during a subframe, determine that the first UE is to transmit a sidelink transmission using a second subchannel of the sidelink control channel during the subframe, the second subchannel being different from the first subchannel, and transmit, by the first UE and during the subframe, the control channel message retransmission of the second UE using the first subchannel and the sidelink transmission of the first UE using the second subchannel. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
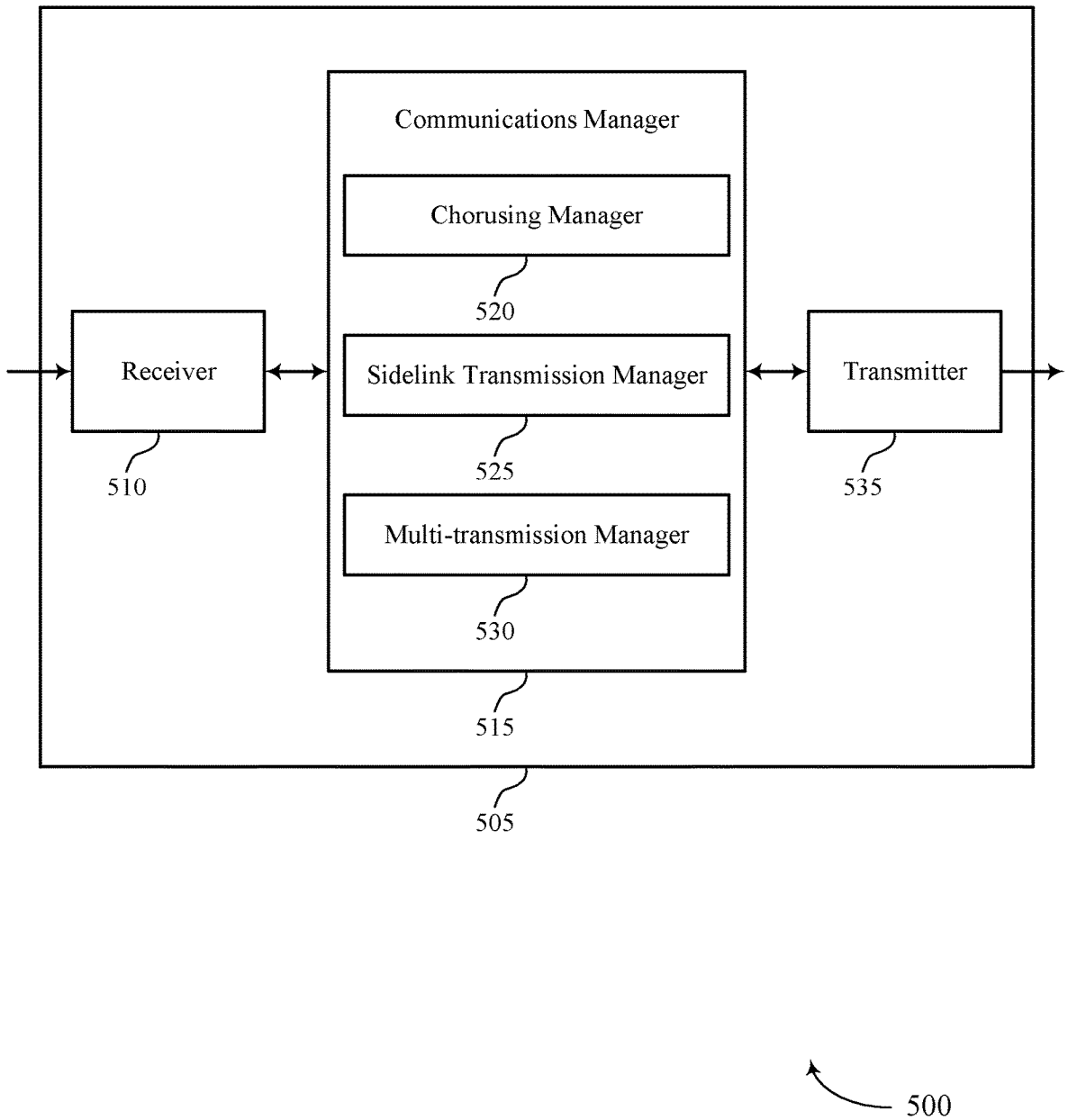

FIG. 5 shows a block diagram 500 of a device 505 that supports sidelink control channel reinforcing in vehicle based wireless communications in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to sidelink control channel reinforcing in vehicle based wireless communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a chorusing manager 520, a sidelink transmission manager 525, and a multi-transmission manager 530. The communications manager 515 may be an example of aspects of the communications manager 710 described herein.

The chorusing manager 520 may determine that a second UE is to transmit a control channel message retransmission using a first subchannel of a sidelink control channel during a subframe.

The sidelink transmission manager 525 may determine that the first UE is to transmit a sidelink transmission using a second subchannel of the sidelink control channel during the subframe, the second subchannel being different from the first subchannel.

The multi-transmission manager 530 may transmit, by the first UE and during the subframe, the control channel message retransmission of the second UE using the first subchannel and the sidelink transmission of the first UE using the second subchannel.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
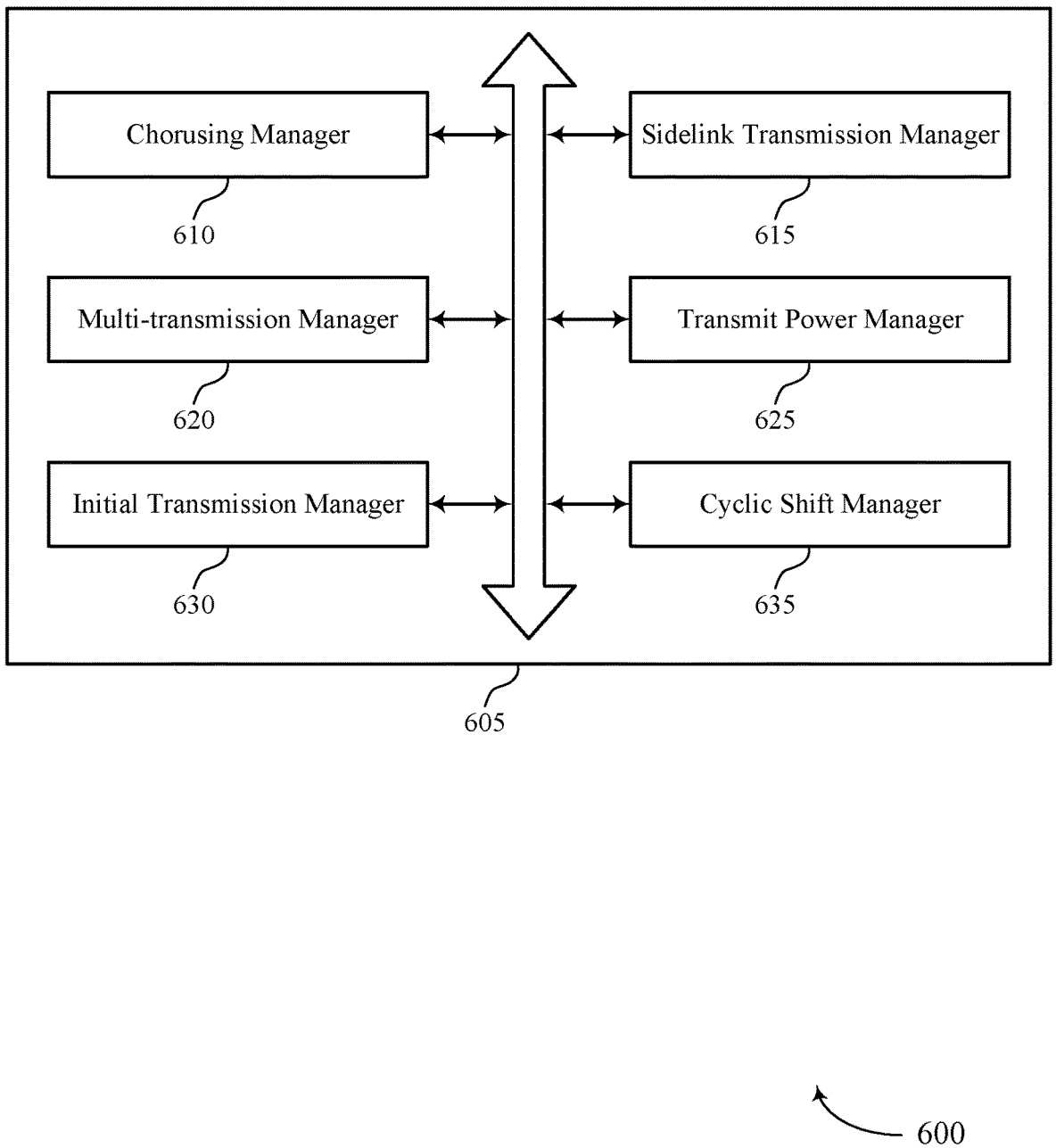
FIG. 6 shows a block diagram of a communications manager that supports sidelink control channel reinforcing in vehicle based wireless communications in accordance with aspects of the present disclosure.

FIG. 6 shows a block diagram 600 of a communications manager 605 that supports sidelink control channel reinforcing in vehicle based wireless communications in accordance with aspects of the present disclosure. The communications manager 605 may be an example of aspects of a communications manager 415, a communications manager 515, or a communications manager 710 described herein. The communications manager 605 may include a chorusing manager 610, a sidelink transmission manager 615, a multi-transmission manager 620, a transmit power manager 625, an initial transmission manager 630, and a cyclic shift manager 635. Each of these modules may communicate, directly or indirectly, with one another (e.g., via one or more buses).

The chorusing manager 610 may determine that a second UE is to transmit a control channel message retransmission using a first subchannel of a sidelink control channel during a subframe.

The sidelink transmission manager 615 may determine that the first UE is to transmit a sidelink transmission using a second subchannel of the sidelink control channel during the subframe, the second subchannel being different from the first subchannel.

The multi-transmission manager 620 may transmit, by the first UE and during the subframe, the control channel message retransmission of the second UE using the first subchannel and the sidelink transmission of the first UE using the second subchannel.

The transmit power manager 625 may identify an available transmit power limit for transmitting on the sidelink control channel during the subframe. In some examples, the transmit power manager 625 may determine that a first transmit power for transmitting the control channel message retransmission of the second UE during the subframe satisfies less than a threshold percentage of the available transmit power limit. In some examples, the transmit power manager 625 may select the first transmit power for transmitting the sidelink transmission using the second subchannel of the sidelink control channel during the subframe.

The initial transmission manager 630 may receive a control channel message initial transmission and corresponding data channel transmission from the second UE during a previous subframe. In some examples, the initial transmission manager 630 may determine that the control channel message retransmission is to be transmitted by the second UE during the subframe based on the control channel message initial transmission and corresponding data channel transmission. In some examples, the initial transmission manager 630 may decode the control channel message initial transmission and corresponding data channel transmission, where the control channel message retransmission is transmitted on the first subchannel of the sidelink control channel during the subframe based on the decoding.

The cyclic shift manager 635 may select a cyclic shift for transmitting the control channel message retransmission using the first subchannel. In some cases, the selected cyclic shift is different from a cyclic shift used by the second UE for transmitting the control channel message retransmission using the first subchannel during the subframe. In some cases, the selected cyclic shift is the same as a cyclic shift used by the second UE for transmitting the control channel message retransmission using the first subchannel during the subframe.

Figure 7:
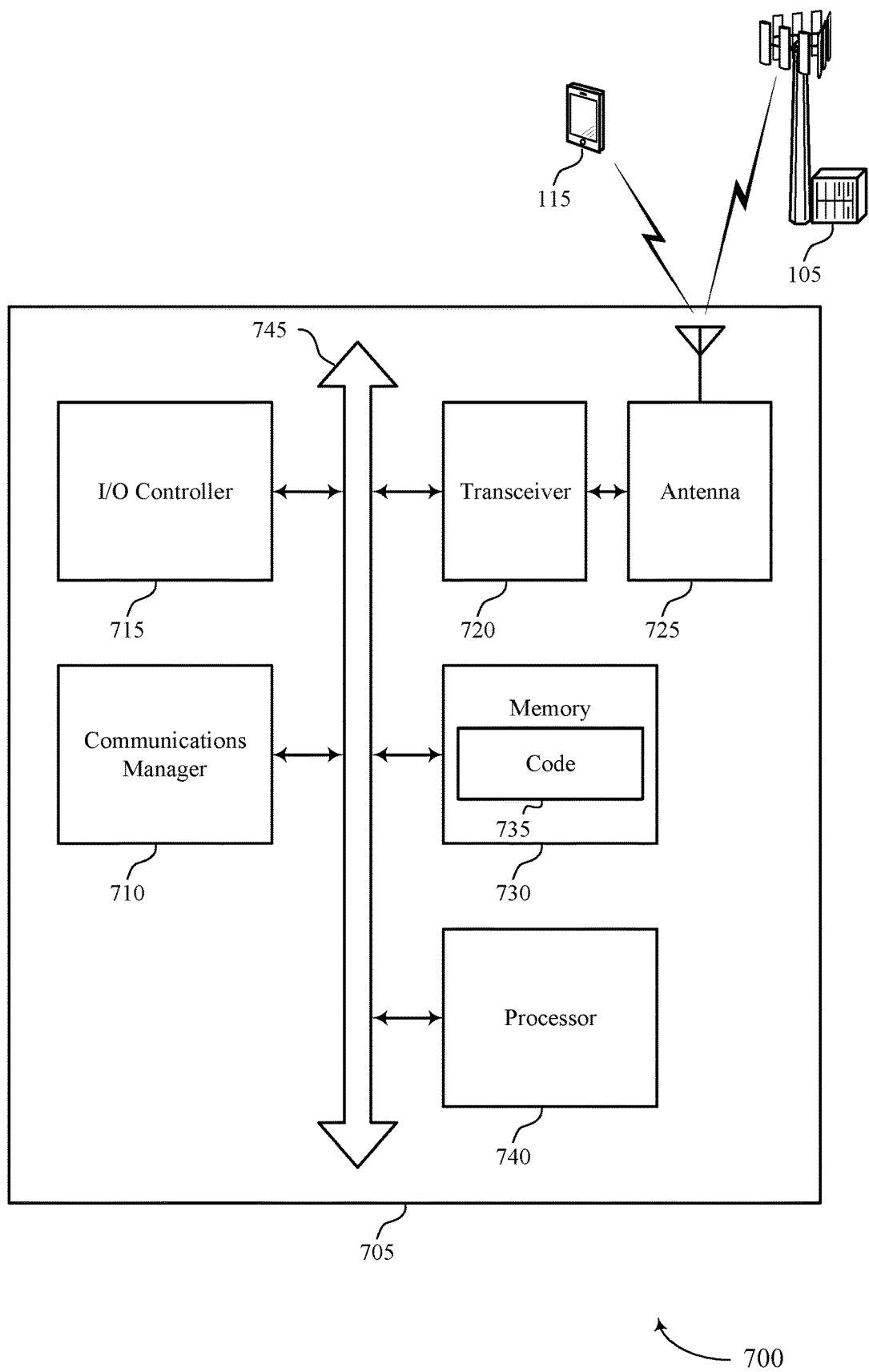
FIG. 7 shows a diagram of a system including a device that supports sidelink control channel reinforcing in vehicle based wireless communications in accordance with aspects of the present disclosure.

FIG. 7 shows a diagram of a system 700 including a device 705 that supports sidelink control channel reinforcing in vehicle based wireless communications in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine that a second UE is to transmit a control channel message retransmission using a first subchannel of a sidelink control channel during a subframe, determine that the first UE is to transmit a sidelink transmission using a second subchannel of the sidelink control channel during the subframe, the second subchannel being different from the first subchannel, and transmit, by the first UE and during the subframe, the control channel message retransmission of the second UE using the first subchannel and the sidelink transmission of the first UE using the second subchannel.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting sidelink control channel reinforcing in vehicle based wireless communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
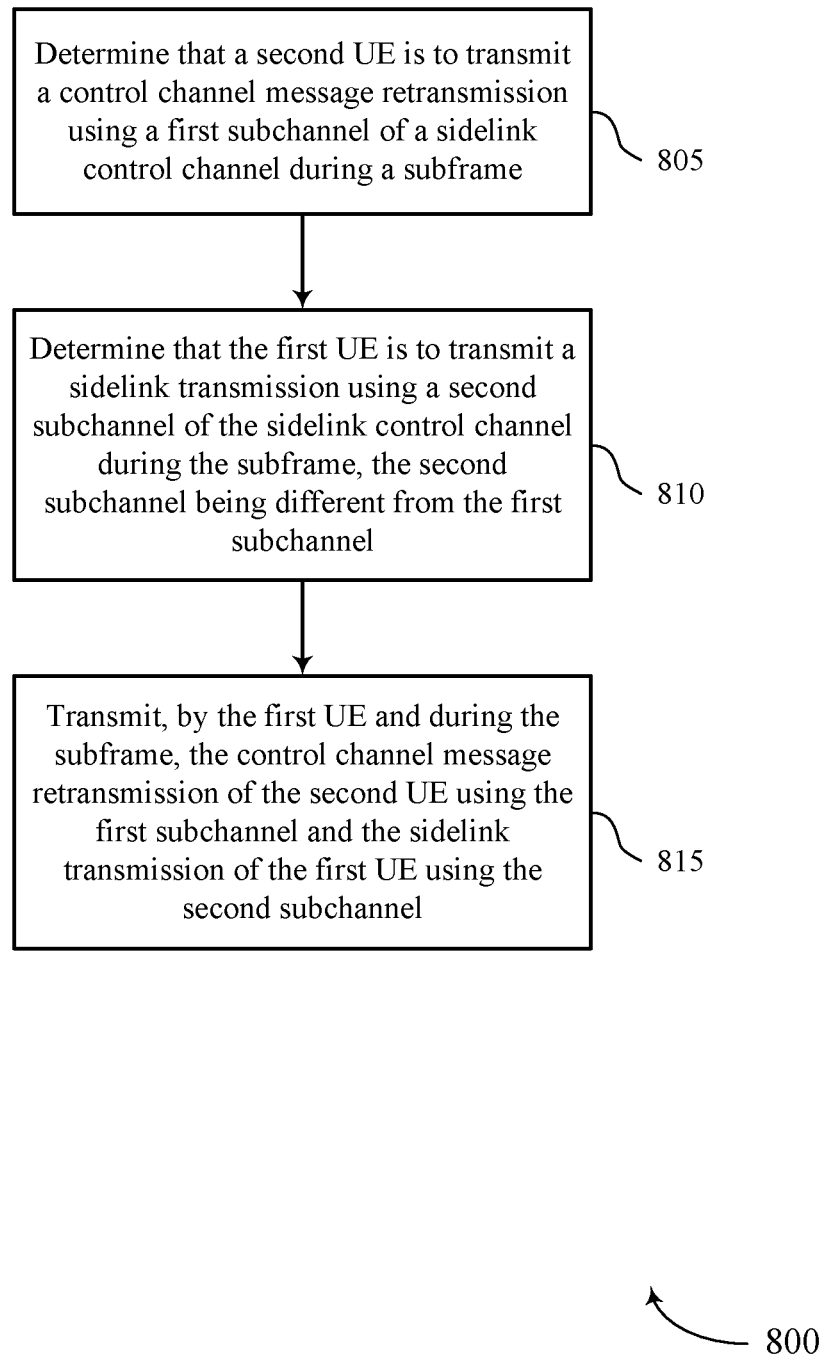
FIGS. 8 through 11 show flowcharts illustrating methods that support sidelink control channel reinforcing in vehicle based wireless communications in accordance with aspects of the present disclosure.

FIG. 8 shows a flowchart illustrating a method 800 that supports sidelink control channel reinforcing in vehicle based wireless communications in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below.

Additionally or alternatively, a UE may perform aspects of the functions described below using special-purpose hardware.

At 805, the UE may determine that a second UE is to transmit a control channel message retransmission using a first subchannel of a sidelink control channel during a subframe. The operations of 805 may be performed according to the methods described herein. In some examples, aspects of the operations of 805 may be performed by a chorusing manager as described with reference to FIGS. 4 through 7.

At 810, the UE may determine that the first UE is to transmit a sidelink transmission using a second subchannel of the sidelink control channel during the subframe, the second subchannel being different from the first subchannel. The operations of 810 may be performed according to the methods described herein. In some examples, aspects of the operations of 810 may be performed by a sidelink transmission manager as described with reference to FIGS. 4 through 7.

At 815, the UE may transmit, by the first UE and during the subframe, the control channel message retransmission of the second UE using the first subchannel and the sidelink transmission of the first UE using the second subchannel. The operations of 815 may be performed according to the methods described herein. In some examples, aspects of the operations of 815 may be performed by a multi-transmission manager as described with reference to FIGS. 4 through 7.

Figure 9:
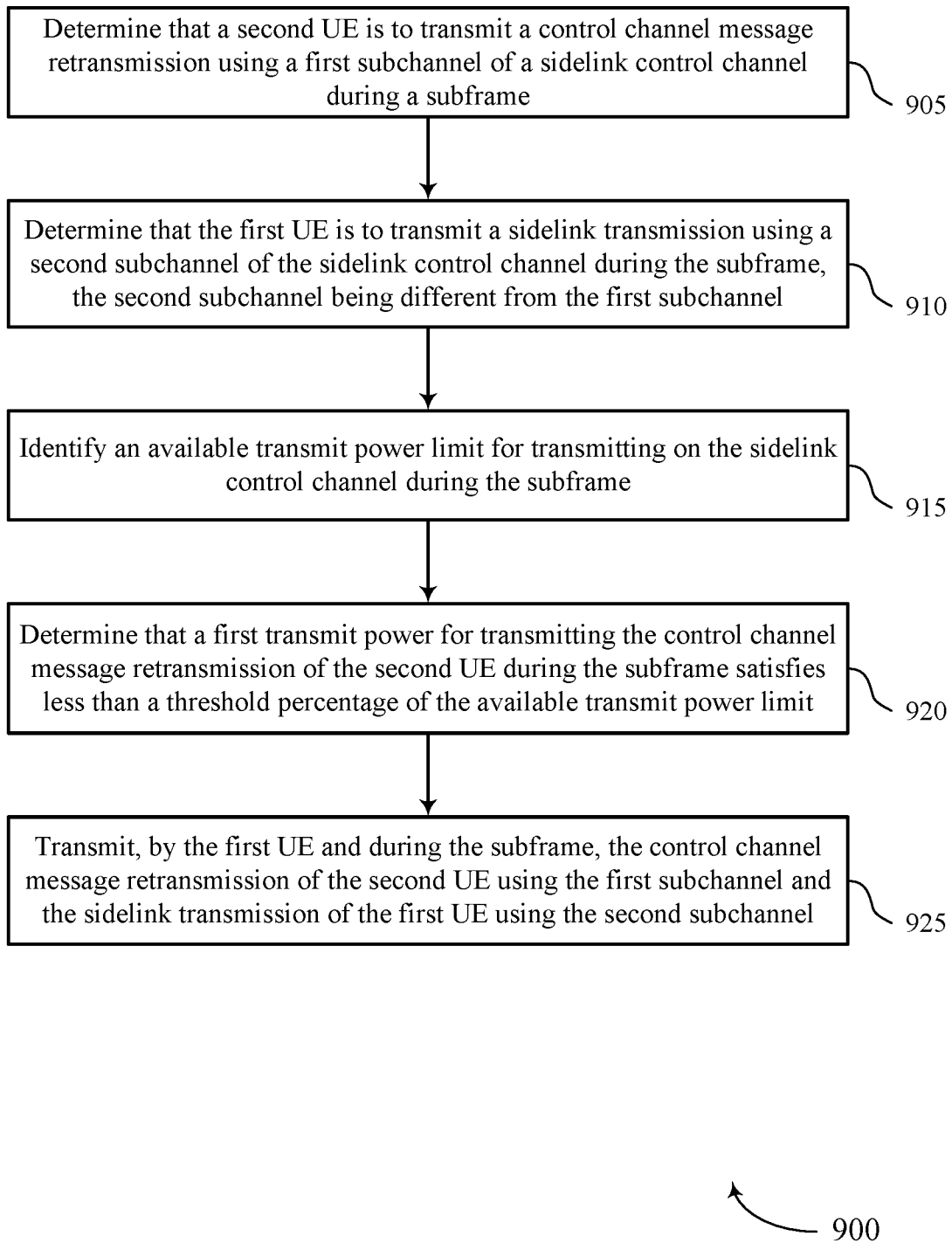

FIG. 9 shows a flowchart illustrating a method 900 that supports sidelink control channel reinforcing in vehicle based wireless communications in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may determine that a second UE is to transmit a control channel message retransmission using a first subchannel of a sidelink control channel during a subframe. The operations of 905 may be performed according to the methods described herein. In some examples, aspects of the operations of 905 may be performed by a chorusing manager as described with reference to FIGS. 4 through 7.

At 910, the UE may determine that the first UE is to transmit a sidelink transmission using a second subchannel of the sidelink control channel during the subframe, the second subchannel being different from the first subchannel. The operations of 910 may be performed according to the methods described herein. In some examples, aspects of the operations of 910 may be performed by a sidelink transmission manager as described with reference to FIGS. 4 through 7.

At 915, the UE may identify an available transmit power limit for transmitting on the sidelink control channel during the subframe. The operations of 915 may be performed according to the methods described herein. In some examples, aspects of the operations of 915 may be performed by a transmit power manager as described with reference to FIGS. 4 through 7.

At 920, the UE may determine that a first transmit power for transmitting the control channel message retransmission of the second UE during the subframe satisfies less than a threshold percentage of the available transmit power limit. The operations of 920 may be performed according to the methods described herein. In some examples, aspects of the operations of 920 may be performed by a transmit power manager as described with reference to FIGS. 4 through 7.

At 925, the UE may transmit, by the first UE and during the subframe, the control channel message retransmission of the second UE using the first subchannel and the sidelink transmission of the first UE using the second subchannel. The operations of 925 may be performed according to the methods described herein. In some examples, aspects of the operations of 925 may be performed by a multi-transmission manager as described with reference to FIGS. 4 through 7.

Figure 10:
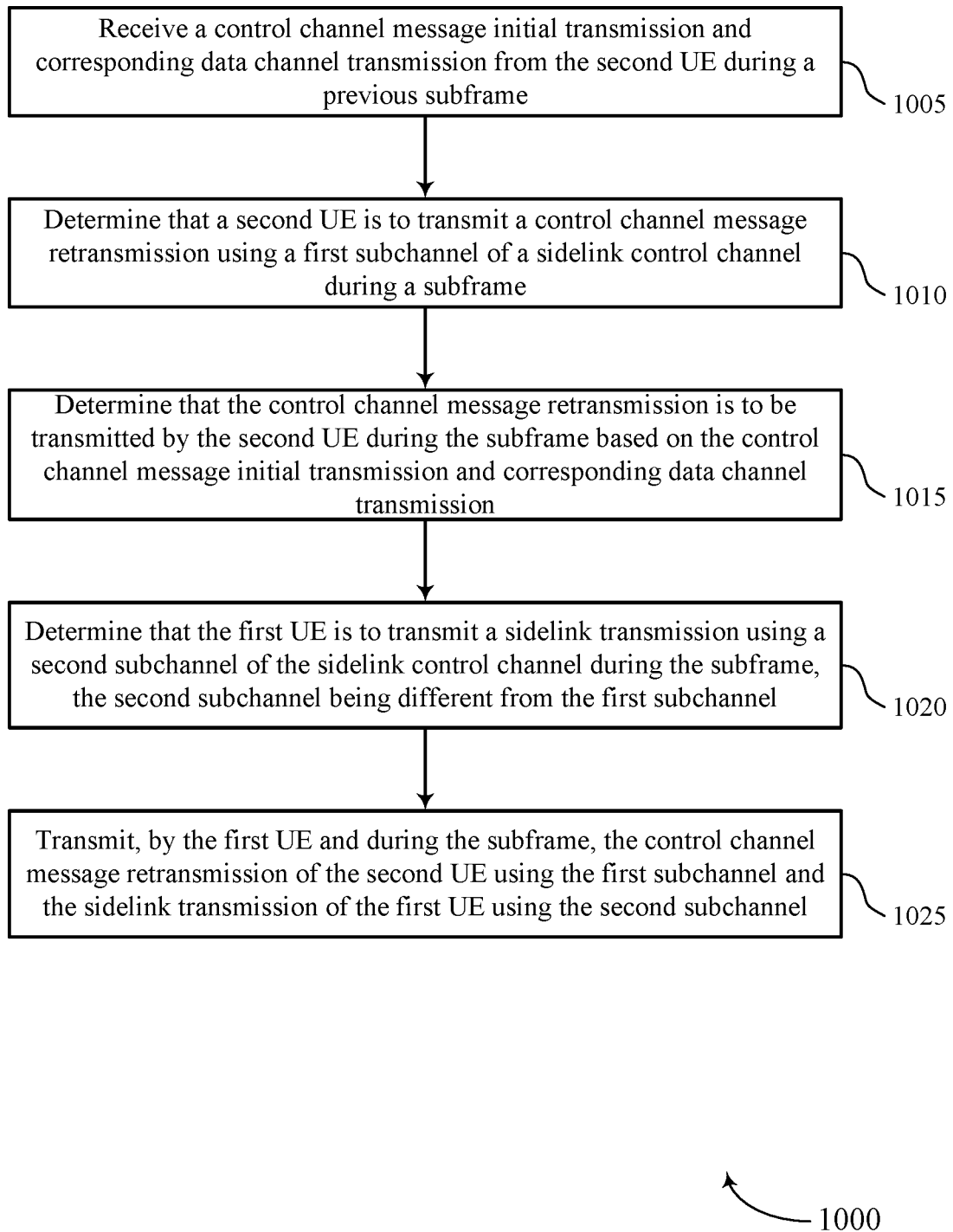

FIG. 10 shows a flowchart illustrating a method 1000 that supports sidelink control channel reinforcing in vehicle based wireless communications in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may receive a control channel message initial transmission and corresponding data channel transmission from the second UE during a previous subframe. The operations of 1005 may be performed according to the methods described herein. In some examples, aspects of the operations of 1005 may be performed by an initial transmission manager as described with reference to FIGS. 4 through 7.

At 1010, the UE may determine that a second UE is to transmit a control channel message retransmission using a first subchannel of a sidelink control channel during a subframe. The operations of 1010 may be performed according to the methods described herein. In some examples, aspects of the operations of 1010 may be performed by a chorusing manager as described with reference to FIGS. 4 through 7.

At 1015, the UE may determine that the control channel message retransmission is to be transmitted by the second UE during the subframe based on the control channel message initial transmission and corresponding data channel transmission. The operations of 1015 may be performed according to the methods described herein. In some examples, aspects of the operations of 1015 may be performed by an initial transmission manager as described with reference to FIGS. 4 through 7.

At 1020, the UE may determine that the first UE is to transmit a sidelink transmission using a second subchannel of the sidelink control channel during the subframe, the second subchannel being different from the first subchannel. The operations of 1020 may be performed according to the methods described herein. In some examples, aspects of the operations of 1020 may be performed by a sidelink transmission manager as described with reference to FIGS. 4 through 7.

At 1025, the UE may transmit, by the first UE and during the subframe, the control channel message retransmission of the second UE using the first subchannel and the sidelink transmission of the first UE using the second subchannel. The operations of 1025 may be performed according to the methods described herein. In some examples, aspects of the operations of 1025 may be performed by a multi-transmission manager as described with reference to FIGS. 4 through 7.

Figure 11:
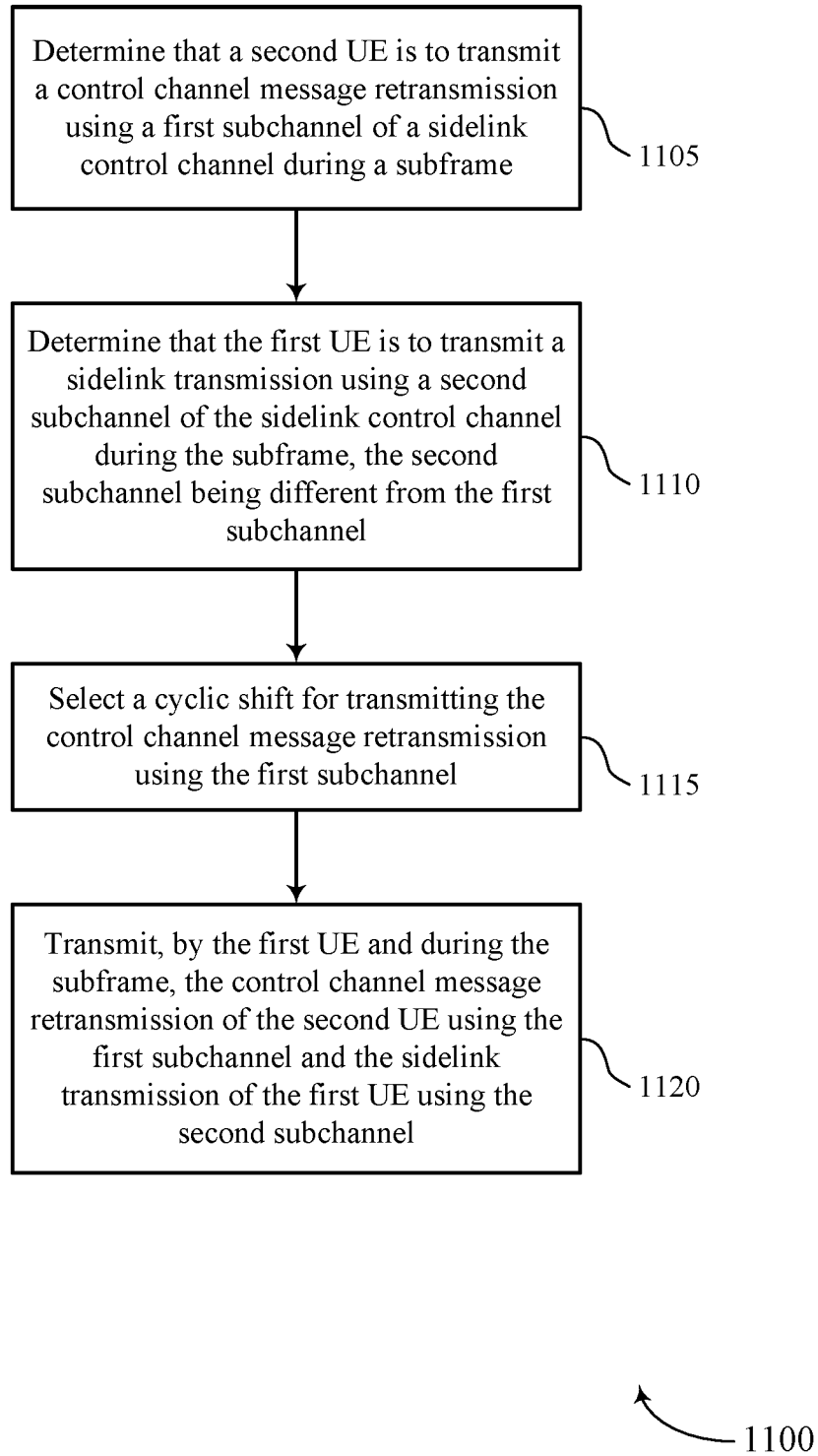

FIG. 11 shows a flowchart illustrating a method 1100 that supports sidelink control channel reinforcing in vehicle based wireless communications in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may determine that a second UE is to transmit a control channel message retransmission using a first subchannel of a sidelink control channel during a subframe. The operations of 1105 may be performed according to the methods described herein. In some examples, aspects of the operations of 1105 may be performed by a chorusing manager as described with reference to FIGS. 4 through 7.

At 1110, the UE may determine that the first UE is to transmit a sidelink transmission using a second subchannel of the sidelink control channel during the subframe, the second subchannel being different from the first subchannel. The operations of 1110 may be performed according to the methods described herein. In some examples, aspects of the operations of 1110 may be performed by a sidelink transmission manager as described with reference to FIGS. 4 through 7.

At 1115, the UE may select a cyclic shift for transmitting the control channel message retransmission using the first subchannel. The operations of 1115 may be performed according to the methods described herein. In some examples, aspects of the operations of 1115 may be performed by a cyclic shift manager as described with reference to FIGS. 4 through 7.

At 1120, the UE may transmit, by the first UE and during the subframe, the control channel message retransmission of the second UE using the first subchannel and the sidelink transmission of the first UE using the second subchannel. The operations of 1120 may be performed according to the methods described herein. In some examples, aspects of the operations of 1120 may be performed by a multi-transmission manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Example 1 is a method for wireless communication at a first UE that includes: determining that a second UE is to transmit a control channel message retransmission using a first subchannel of a sidelink control channel during a subframe; determining that the first UE is to transmit a sidelink transmission using a second subchannel of the sidelink control channel during the subframe, the second subchannel being different from the first subchannel; and transmitting, by the first UE and during the subframe, the control channel message retransmission of the second UE using the first subchannel and the sidelink transmission of the first UE using the second subchannel.

In example 2, the method of example 1 may include identifying an available transmit power limit for transmitting on the sidelink control channel during the subframe; and determining that a first transmit power for transmitting the control channel message retransmission of the second UE during the subframe satisfies less than a threshold percentage of the available transmit power limit.

In example 3, the method of any of examples 1-2 may include selecting the first transmit power for transmitting the sidelink transmission using the second subchannel of the sidelink control channel during the subframe.

In example 4, the method of any of examples 1-3 may include receiving a control channel message initial transmission and corresponding data channel transmission from the second UE during a previous subframe; and determining that the control channel message retransmission is to be transmitted by the second UE during the subframe based at least in part on the control channel message initial transmission and corresponding data channel transmission.

In example 5, the method of any of examples 1-4 may include decoding the control channel message initial transmission and corresponding data channel transmission, wherein the control channel message retransmission is transmitted on the first subchannel of the sidelink control channel during the subframe based at least in part on the decoding.

In example 6, the method of any of examples 1-5 may include selecting a cyclic shift for transmitting the control channel message retransmission using the first subchannel.

In example 7, the method of any of examples 1-6 may include the selected cyclic shift being different from a cyclic shift used by the second UE for transmitting the control channel message retransmission using the first subchannel during the subframe.

In example 8, the method of any of examples 1-7 may include the selected cyclic shift being the same as a cyclic shift used by the second UE for transmitting the control channel message retransmission using the first subchannel during the subframe.

Example 9 is a system or apparatus including means for implementing a method or realizing an apparatus as in any of examples 1-8.

Example 10 is a non-transitory computer-readable medium storing instructions executable by one or more processors to cause the one or more processors to implement a method as in any of examples 1-8.

Example 11 is a system including one or more processors and memory in electronic communication with the one or more processors storing instructions executable by the one or more processors to cause the system or apparatus to implement a method as in any of examples 1-8.

Aspects of these examples may be combined with aspects or embodiments disclosed in other implementations Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    determining that a second UE is to transmit a control channel message retransmission using a first subchannel of a sidelink control channel during a subframe;
    determining that the first UE is to transmit a sidelink transmission using a second subchannel of the sidelink control channel during the subframe, the second subchannel being different from the first subchannel; and
    transmitting, by the first UE and during the subframe, the control channel message retransmission of the second UE using the first subchannel and the sidelink transmission of the first UE using the second subchannel.

2. The method of claim 1, further comprising:
    identifying an available transmit power limit for transmitting on the sidelink control channel during the subframe; and
    determining that a first transmit power for transmitting the control channel message retransmission of the second UE during the subframe satisfies less than a threshold percentage of the available transmit power limit.

3. The method of claim 2, further comprising:
selecting the first transmit power for transmitting the sidelink transmission using the second subchannel of the sidelink control channel during the subframe.

4. The method of claim 1, further comprising:
receiving a control channel message initial transmission and corresponding data channel transmission from the second UE during a previous subframe; and
determining that the control channel message retransmission is to be transmitted by the second UE during the subframe based at least in part on the control channel message initial transmission and corresponding data channel transmission.

5. The method of claim 4, further comprising:
decoding the control channel message initial transmission and corresponding data channel transmission, wherein the control channel message retransmission is transmitted on the first subchannel of the sidelink control channel during the subframe based at least in part on the decoding.

6. The method of claim 1, further comprising:
selecting a cyclic shift for transmitting the control channel message retransmission using the first subchannel.

7. The method of claim 6, wherein the selected cyclic shift is different from a cyclic shift used by the second UE for transmitting the control channel message retransmission using the first subchannel during the subframe.

8. The method of claim 6, wherein the selected cyclic shift is the same as a cyclic shift used by the second UE for transmitting the control channel message retransmission using the first subchannel during the subframe.

9. An apparatus for wireless communication at a first user equipment (UE), comprising:
a processor,
memory coupled with the processor; and
instructions stored in the memory and executable by the processor to cause the apparatus to:
determine that a second UE is to transmit a control channel message retransmission using a first subchannel of a sidelink control channel during a subframe;
determine that the first UE is to transmit a sidelink transmission using a second subchannel of the sidelink control channel during the subframe, the second subchannel being different from the first subchannel; and
transmit, by the first UE and during the subframe, the control channel message retransmission of the second UE using the first subchannel and the sidelink transmission of the first UE using the second subchannel.

10. The apparatus of claim 9, wherein the instructions are further executable by the processor to cause the apparatus to:
identify an available transmit power limit for transmitting on the sidelink control channel during the subframe; and
determine that a first transmit power for transmitting the control channel message retransmission of the second UE during the subframe satisfies less than a threshold percentage of the available transmit power limit.

11. The apparatus of claim 10, wherein the instructions are further executable by the processor to cause the apparatus to:
select the first transmit power for transmitting the sidelink transmission using the second subchannel of the sidelink control channel during the subframe.

12. The apparatus of claim 9, wherein the instructions are further executable by the processor to cause the apparatus to:
receive a control channel message initial transmission and corresponding data channel transmission from the second UE during a previous subframe; and
determine that the control channel message retransmission is to be transmitted by the second UE during the subframe based at least in part on the control channel message initial transmission and corresponding data channel transmission.

13. The apparatus of claim 12, wherein the instructions are further executable by the processor to cause the apparatus to:
decode the control channel message initial transmission and corresponding data channel transmission, wherein the control channel message retransmission is transmitted on the first subchannel of the sidelink control channel during the subframe based at least in part on the decoding.

14. The apparatus of claim 9, wherein the instructions are further executable by the processor to cause the apparatus to:
select a cyclic shift for transmitting the control channel message retransmission using the first subchannel.

15. The apparatus of claim 14, wherein the selected cyclic shift is different from a cyclic shift used by the second UE for transmitting the control channel message retransmission using the first subchannel during the subframe.

16. The apparatus of claim 14, wherein the selected cyclic shift is the same as a cyclic shift used by the second UE for transmitting the control channel message retransmission using the first subchannel during the subframe.

17. An apparatus for wireless communication at a first user equipment (UE), comprising:
means for determining that a second UE is to transmit a control channel message retransmission using a first subchannel of a sidelink control channel during a subframe;
means for determining that the first UE is to transmit a sidelink transmission using a second subchannel of the sidelink control channel during the subframe, the second subchannel being different from the first subchannel; and
means for transmitting, by the first UE and during the subframe, the control channel message retransmission of the second UE using the first subchannel and the sidelink transmission of the first UE using the second subchannel.

18. The apparatus of claim 17, further comprising:
means for identifying an available transmit power limit for transmitting on the sidelink control channel during the subframe; and
means for determining that a first transmit power for transmitting the control channel message retransmission of the second UE during the subframe satisfies less than a threshold percentage of the available transmit power limit.

19. The apparatus of claim 18, further comprising:
means for selecting the first transmit power for transmitting the sidelink transmission using the second subchannel of the sidelink control channel during the subframe.

20. The apparatus of claim 17, further comprising:
means for receiving a control channel message initial transmission and corresponding data channel transmission from the second UE during a previous subframe; and means for determining that the control channel message retransmission is to be transmitted by the second UE during the subframe based at least in part on the control channel message initial transmission and corresponding data channel transmission.

21. The apparatus of claim 20, further comprising:
means for decoding the control channel message initial transmission and corresponding data channel transmission, wherein the control channel message retransmission is transmitted on the first subchannel of the sidelink control channel during the subframe based at least in part on the decoding.

22. The apparatus of claim 17, further comprising:
means for selecting a cyclic shift for transmitting the control channel message retransmission using the first subchannel.

23. The apparatus of claim 22, wherein the selected cyclic shift is different from a cyclic shift used by the second UE for transmitting the control channel message retransmission using the first subchannel during the subframe.

24. The apparatus of claim 22, wherein the selected cyclic shift is the same as a cyclic shift used by the second UE for transmitting the control channel message retransmission using the first subchannel during the subframe.

25. A non-transitory computer-readable medium storing code for wireless communication at a first user equipment (UE), the code comprising instructions executable by a processor to:
determine that a second UE is to transmit a control channel message retransmission using a first subchannel of a sidelink control channel during a subframe;
determine that the first UE is to transmit a sidelink transmission using a second subchannel of the sidelink control channel during the subframe, the second subchannel being different from the first subchannel; and
transmit, by the first UE and during the subframe, the control channel message retransmission of the second UE using the first subchannel and the sidelink transmission of the first UE using the second subchannel.

26. The non-transitory computer-readable medium of claim 25, wherein the instructions are further executable to:
identify an available transmit power limit for transmitting on the sidelink control channel during the subframe; and
determine that a first transmit power for transmitting the control channel message retransmission of the second UE during the subframe satisfies less than a threshold percentage of the available transmit power limit.

27. The non-transitory computer-readable medium of claim 26, wherein the instructions are further executable to:
select the first transmit power for transmitting the sidelink transmission using the second subchannel of the sidelink control channel during the subframe.

28. The non-transitory computer-readable medium of claim 25, wherein the instructions are further executable to:
receive a control channel message initial transmission and corresponding data channel transmission from the second UE during a previous subframe; and
determine that the control channel message retransmission is to be transmitted by the second UE during the subframe based at least in part on the control channel message initial transmission and corresponding data channel transmission.

29. The non-transitory computer-readable medium of claim 28, wherein the instructions are further executable to:
decode the control channel message initial transmission and corresponding data channel transmission, wherein the control channel message retransmission is transmitted on the first subchannel of the sidelink control channel during the subframe based at least in part on the decoding.

30. The non-transitory computer-readable medium of claim 25, wherein the instructions are further executable to:
select a cyclic shift for transmitting the control channel message retransmission using the first subchannel.

31. The non-transitory computer-readable medium of claim 30, wherein the selected cyclic shift is different from a cyclic shift used by the second UE for transmitting the control channel message retransmission using the first subchannel during the subframe.

32. The non-transitory computer-readable medium of claim 30, wherein the selected cyclic shift is the same as a cyclic shift used by the second UE for transmitting the control channel message retransmission using the first subchannel during the subframe.

* * * * *